United States Patent
Sawyer

(10) Patent No.: US 8,737,552 B1
(45) Date of Patent: May 27, 2014

(54) SYNCHRONOUS DATA TRANSFER

(75) Inventor: Nicholas J. Sawyer, Brax (FR)

(73) Assignee: Xilinx, Inc., San Jose, CA (US)

( * ) Notice: Subject to any disclaimer, the term of this patent is extended or adjusted under 35 U.S.C. 154(b) by 688 days.

(21) Appl. No.: 13/009,382

(22) Filed: Jan. 19, 2011

(51) Int. Cl.
*H04L 7/02* (2006.01)

(52) U.S. Cl.
USPC ........... 375/359; 375/355; 375/356; 375/357; 375/358; 327/156; 327/157; 327/158

(58) Field of Classification Search
USPC .......... 375/257, 259, 340, 355, 359; 327/115, 327/147, 158
See application file for complete search history.

(56) References Cited

U.S. PATENT DOCUMENTS

| | | | | |
|---|---|---|---|---|
| 5,173,617 A | * | 12/1992 | Alsup et al. | 327/158 |
| 2008/0037693 A1 | * | 2/2008 | Andrus et al. | 375/359 |
| 2008/0279320 A1 | * | 11/2008 | Rocas et al. | 375/355 |
| 2011/0185215 A1 | * | 7/2011 | Neben | 713/401 |

OTHER PUBLICATIONS

Brugger, et al., *A high speed parallel link based on a ternary linecode*, 5th European Fibre Optic, Communications and Local Area Networks Exposition, European World Trade Convention Center Basel, Switzerland, Jun. 3-5, 1987, pp. 177-181.
Manchester code, printed on Oct. 27, 2010 from Wikipedia website, pp. 1-4, http://en.wikipedia.org/wiki/Manchester_encoding.

* cited by examiner

*Primary Examiner* — Daniel Washburn
*Assistant Examiner* — Eboni Hughes
(74) *Attorney, Agent, or Firm* — Gerald Chan

(57) ABSTRACT

A method of and apparatus for synchronous data transfer are described. The method may include encoding a clock period and data into an encoded signal, transmitting the encoded signal from a master device to a slave device, and recovering the data at the slave device without using a local oscillator. The apparatus may comprise a first integrated circuit including a master device configured to transmit an encoded signal of a clock period and data on a first port, and a second integrated circuit including a slave device where the slave device is configured to receive the encoded signal on a second port coupled to the first port and to recover the data without using a local oscillator.

16 Claims, 4 Drawing Sheets

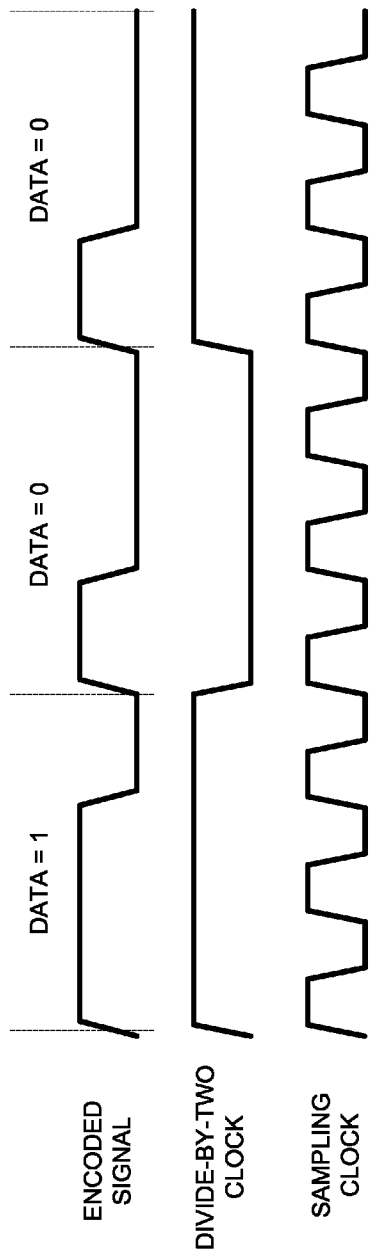
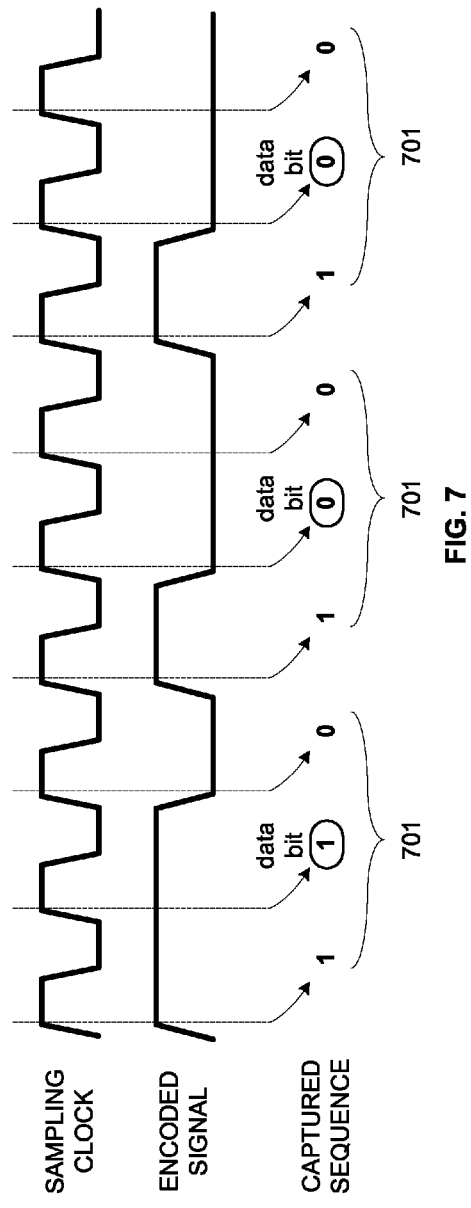

SYNCHRONOUS DATA TRANSFER

TECHNICAL FIELD

An embodiment described herein relates to integrated circuit devices (ICs), and in particular, to a method of and circuit for synchronous data transfer.

BACKGROUND

Two techniques are used to synchronously transfer data between devices. In one technique, both a clock and data are transmitted separately from a master device to a slave device. The slave device recovers the data by using the transmitted clock to sample the incoming data. Examples of this technique include Serial Peripheral Interface Bus (SPI) and Inter-Integrated Circuit (I2C). However, this technique requires two or more physical connections between the devices.

The second technique is where the clock information and data are encoded together into a single signal. This signal is then transmitted over one physical connection from a master device to a slave device. Various methods exist to perform this encoding. However, with the existing methods, a local oscillator and possibly a discrete phase-locked loop (PLL) are required at the slave device to perform clock and data recovery.

SUMMARY

In accordance with an embodiment, a method of synchronous data transfer comprises encoding a first clock period and forward data into an encoded signal, transmitting the encoded signal from a master device to a slave device, and recovering the forward data at the slave device without using a local oscillator.

In accordance with another embodiment, an apparatus for synchronous data transfer comprises a first integrated circuit including a master device configured to transmit an encoded signal of a first clock period and forward data on a first port. The apparatus further comprises a second integrated circuit including a slave device configured to receive the encoded signal on a second port coupled to the first port, and to recover the forward data without using a local oscillator.

In accordance with yet another embodiment, an apparatus for data processing comprises an integrated circuit including a slave device having a first input port configured to receive bit sequences that correspond to respective data, where at least one of the bit sequences has a duration equal to a first clock period and comprises a first interval at a first logic level, a second interval comprising n bits that represents one of the data, and a third interval at a second logic level, where the slave device is configured to recover at least one of the data without using a local oscillator.

Other and further aspects and features will be evident from reading the following detailed description of one or more embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 6 illustrates an example of the generation of a sampling clock for data recovery in accordance with some embodiments.

FIG. 7 illustrates an example of data recovery by sampling the encoded signal with the sampling clock in accordance with some embodiments.

DETAILED DESCRIPTION

Figure 1:
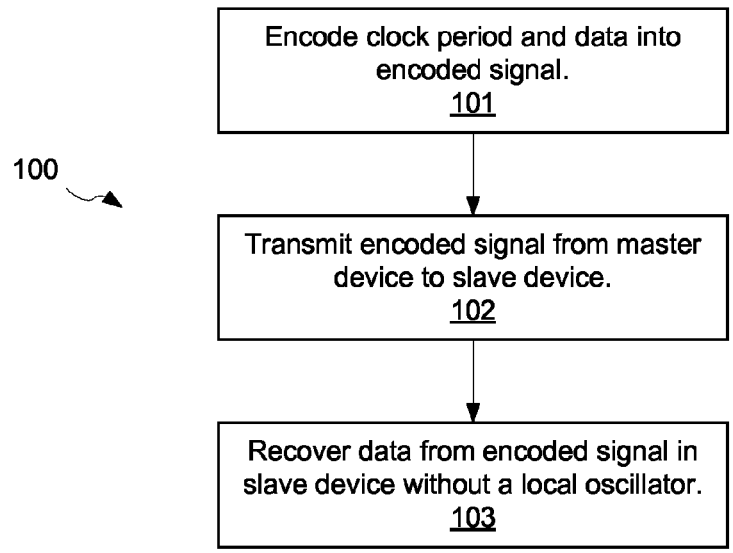
FIG. 1 illustrates a method of synchronous data transfer according to some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment of the invention. Thus, the appearances of the phrase "in some embodiments" or "in other embodiments" in various places throughout this specification are not necessarily referring to the same embodiment or embodiments.

Figure 2:
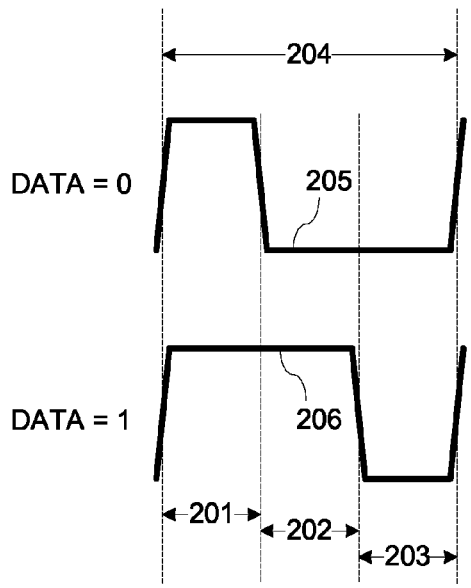
FIG. 2 illustrates an example of a bit sequence of the encoded signal comprising three bits to encode a data bit every clock period in accordance with some embodiments.

FIG. 1 shows a method 100 to synchronously transfer data between a master device and a slave device in accordance with some embodiments. For clarity of explanation, forward data refers to data that are transferred from the master device to the slave device, and backward data refers to data that are transferred from the slave device to the master device. Also, as used in this specification, the term "master device" may refer to any device that is capable of transmitting data, and does not necessarily perform any control function to control another component. In addition, as used in this specification, the term "slave device" may refer to any device that is capable of receiving data, and should not be limited to any device that is "slaved" to another component in any manner. Furthermore, a master device may also receive data in some embodiments, and a slave device may transmit data in some embodiments. In block 101, a clock period and forward data are encoded into a single encoded signal. FIG. 2 illustrates an example of a bit sequence of the encoded signal for unidirectional data transfer from the master device to the slave device in accordance with some embodiments. In this example, the bit sequence comprises three bits to transfer clock information and one bit of forward data. Each bit sequence starts with a first interval 201 at a high logic level. This is followed by a second interval 202 that represents a forward data bit. The second interval 202 may be at a high logic level or a low logic level. In this example, a low logic level 205 during the second interval represents a forward data bit of 0, and a high logic level 206 represents a forward data bit of 1. The bit sequence ends with a third interval 203 at a low logic level. Hence, in this example, a forward data bit of 0 is encoded as the bit sequence 1-0-0, and a forward data bit of 1 is encoded as the bit sequence 1-1-0. The duration of the bit sequence 204 is equal to the duration of the clock period, and the bit sequence is repeated every clock cycle. The low to high transition at the beginning of the bit sequence represents a rising edge clock transition and occurs in the same place every clock period in the encoded signal. In other embodiments, the forward data bit may be represented by different logic levels or different bit sequences.

Figure 3:
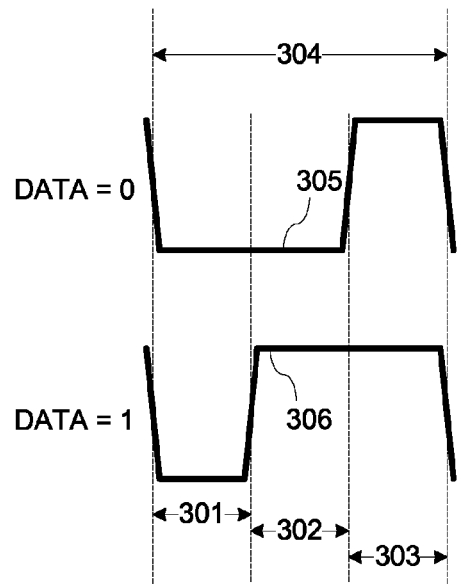
FIG. 3 illustrates another example of a bit sequence of the encoded signal comprising three bits to encode a data bit every clock period in accordance with other embodiments.

FIG. 3 illustrates other embodiments of a bit sequence of the encoded signal that comprises three bits to transfer clock information and one bit of forward data for unidirectional data transfer from the master device to the slave device. In the illustrated embodiments, each bit sequence starts with a first interval 301 at a low logic level. This is followed by a second interval 302 that represents a forward data bit. A low logic level 305 during the second interval represents a forward data bit of 0, and a high logic level 306 represents a forward data bit of 1. The bit sequence ends with a third interval 303 at a high logic level. Hence, in this example, a forward data bit of 0 is encoded as the bit sequence 0-0-1, and a forward data bit of 1 is encoded as the bit sequence 0-1-1. The duration of the bit sequence 304 is equal to the duration of the clock period, and the bit sequence is repeated every clock cycle. The high to low transition at the beginning of the bit sequence represents a falling edge clock transition and occurs in the same place every clock period in the encoded signal. In other embodiments, the forward data bit may be represented by different logic levels or different bit sequences.

Figure 4:
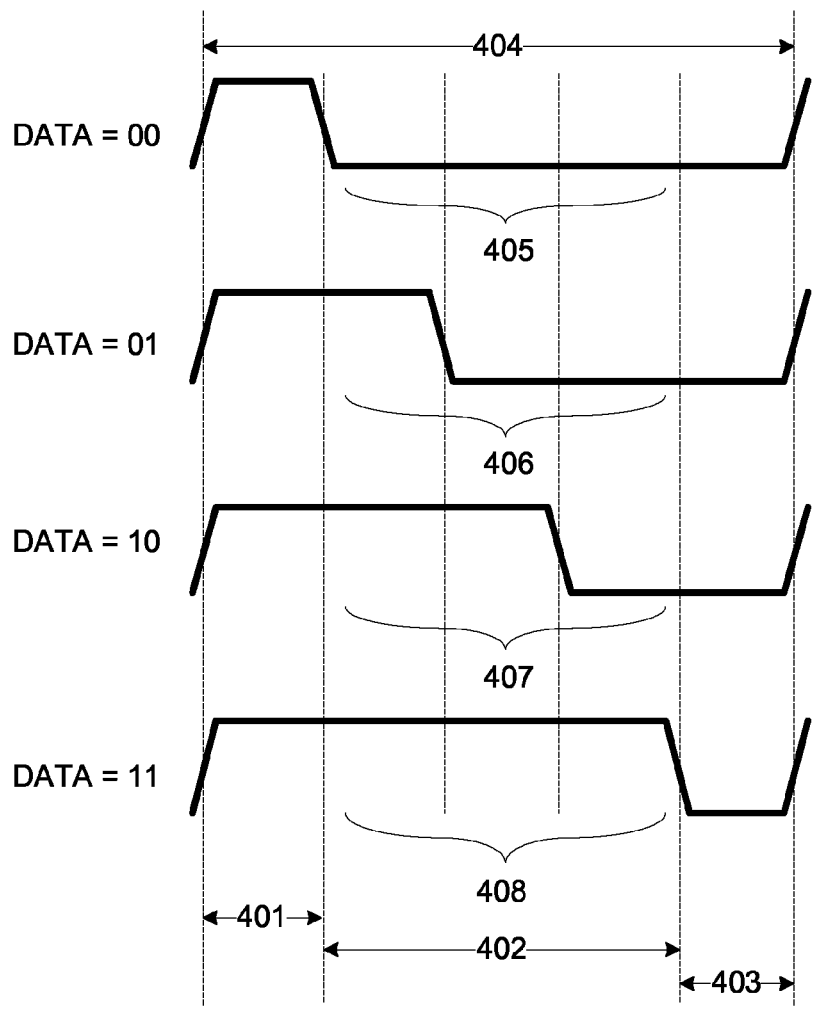
FIG. 4 illustrates a bit sequence of the encoded signal comprising five bits to encode two data bits every clock period in accordance with some embodiments.

The encoded signal is not limited to encoding one data bit every clock period. In other embodiments, any number of data bits may be encoded into n number of bits in the second interval of the bit sequence each clock period, as long as there is at most one logic level transition during the second interval. For example, FIG. 4 shows a bit sequence of the encoded signal that comprises five bits to transfer clock information and two bits of data every clock period in accordance with some embodiments. In the illustrated embodiments, each bit sequence starts with a first interval 401 at a low logic level. This is followed by a second interval 402 comprising of three bits to represent two forward data bits.

As shown in the figure, a forward data of 0-0 is represented by bit pattern 405 having a low logic level during all three bits of the second interval 402. A forward data of 0-1 is represented by bit pattern 406 having a high logic level during the first bit of the second interval 402 followed by a low logic level during the second and third bits of the second interval 402. A forward data of 1-0 is represented by bit pattern 407 having a high logic level during the first and second bits of the second interval 402 followed by a low logic level during the third bit of the second interval 402. A forward data of 1-1 is represented by bit pattern 407 having a high logic level during all three bits of the second interval 402. The bit sequence of the encoded signal ends with a third interval 403 at a low logic level.

Hence, in this example, a forward data of 0-0 is encoded as the bit sequence 1-0-0-0-0; a forward data of 0-1 is encoded as the bit sequence 1-1-0-0-0; a forward data of 1-0 is encoded as the bit sequence 1-1-1-0-0; and a forward data of 1-1 is encoded as the bit sequence 1-1-1-1-0. The entire bit sequence forms a 2b5b encoded data bit pattern, and data rates of 1 gigabits per second (Gbps) may be achieved in some embodiments. The duration of the bit sequence 404 is equal to the duration of the clock period, and the bit sequence is repeated every clock cycle. The low to high transition at the beginning of the bit sequence represents a rising edge clock transition and occurs in the same place every clock period in the encoded signal.

In other embodiments that start the bit sequence on a falling clock edge, the first interval may be at a low logic level and the third interval may be at a high logic level. In such embodiments, the high to low transition at the beginning of the bit sequence represents a falling edge clock transition and occur in the same place every clock period in the encoded signal. In other embodiments, the forward data bit may be represented by different logic levels or different bit sequences.

Figure 5:
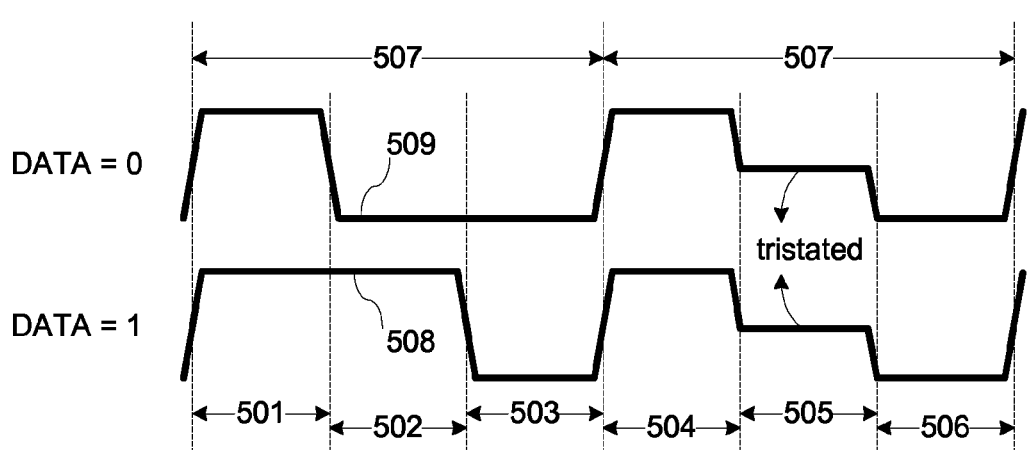
FIG. 5 illustrates a bit sequence of the encoded signal for bidirectional data transfer in accordance with some embodiments.

In other embodiments, the bit sequence of the encoded signal may be extended to bidirectional data transfers between the master device and the slave device. To allow for backward data transfer, as shown in FIG. 5, the encoded signal comprises a repeated pattern of a pair of bit sequences of three bits each to transfer clock information, one bit of forward data, and one bit of backward data. The first bit sequence starts with a first interval 501 at a high logic level. This is followed by a second interval 502 that represents a forward data bit. The second interval 502 may be at a high logic level or a low logic level. In this example, a low logic level 509 during the second interval represents a forward data bit of 0, and a high logic level 508 represents a forward data bit of 1. The first bit sequence ends with a third interval 503 at a low logic level. This is followed by the second bit sequence starting with a fourth interval 504 at a high logic level and then followed by a tri-stated fifth interval 505. During this fifth interval 505, the slave device may transmit backward data back to the master device. The backward data may be represented in the same way as the forward data, or the backward data may be represented differently. The second bit sequence ends with a sixth interval 506 at a low logic level. The durations 507 of both bit sequences are each equal to the duration of the clock period, and the pair of bit sequences is repeated every two clock cycles. The low to high transitions at the beginning of both bit sequences represent rising edge clock transitions and occur in the same place every clock period in the encoded signal.

In other embodiments that start the pair of bit sequences on a falling edge clock, the first and fourth intervals may be at a low logic level and the third and sixth intervals may be at a high logic level. In such embodiments, the high to low transitions at the beginning of both bit sequences represent falling edge clock transitions and occur in the same place every clock period in the encoded signal. In other embodiments, the forward data bit may be represented by different logic levels or different bit sequences, and more than one data bit may be encoded each clock period. Furthermore, the backward data may be represented in the same way as the forward data, or the backward data may be represented differently from the forward data bit. Due to the tri-state mechanism, data rates of 50 megabits per second (Mbps) may be achieved in some embodiments.

Referring back to FIG. 1, the encoded signal is then transmitted from the master device to the slave device in block 102. In some embodiments, the encoded signal may be transmitted over a unidirectional interconnect. In other embodiments, the encoded signal may be transmitted over a bidirectional interconnect. The interconnect between the master device and the slave device may use single-ended signaling over a single connection or differential signaling over a pair of complementary connections.

In block 103, the slave device recovers the forward data from the received encoded signal without using a local oscillator. A local oscillator at the slave device is not needed because the encoded signal allows the receiver to derive a synchronous sampling clock directly from the encoded signal. This sampling clock derived from the encoded signal may then be used to sample the received encoded signal and capture the forward data.

FIG. 6 and FIG. 7 illustrate an example of data recovery at the slave device in accordance with some embodiments. In this particular example, the forward data is encoded in the same way as that shown in the embodiments of FIG. 2. The portion of the encoded signal shown in FIG. 6 represents a forward data sequence of 1-0-0. First, the encoded signal is frequency divided by two to generate a divide-by-two clock that has a 50:50 duty cycle and a clock period equal to twice that of the encoded clock period 204. This divide-by-two clock is then frequency multiplied by six to derive a sampling clock with a period equal to one-third of the encoded clock period. Note that even though in this example, the position of the falling edge in each of the bit sequences in the encoded signal is variable depending on the value of the transmitted data bit, this has no effect on the generation of the sampling clock because the encoded signal is first frequency divided by two to obtain a 50:50 duty cycle clock. The sampling clock may then be used to sample the received encoded signal to capture the bit sequences of the encoded signal as shown in FIG. 7. In the illustrated embodiments, the recovered forward data is simply the middle bit of each of the repeating three-bit sequences 701 of the captured sequence.

In other embodiments where one or more forward data bit is encoded into n number of bits in the second interval of the repeated bit sequences of the encoded signal, the divide-by-two clock is frequency multiplied by 2×(n+2) to derive a sampling clock with a period equal to 1/(n+2) of the encoded clock period. In some embodiments, the frequency division by two may be performed by a toggle flip-flop. The frequency multiplication may be performed by a digital clock manager (DCM) in a configurable integrated circuit, such as a field programmable gate array. In other embodiments, the frequency multiplication may be implemented with a phase-locked loop (PLL) or a delay-lock loop (DLL), or any combination of DCM, PLL, and DLL.

Figure 8:
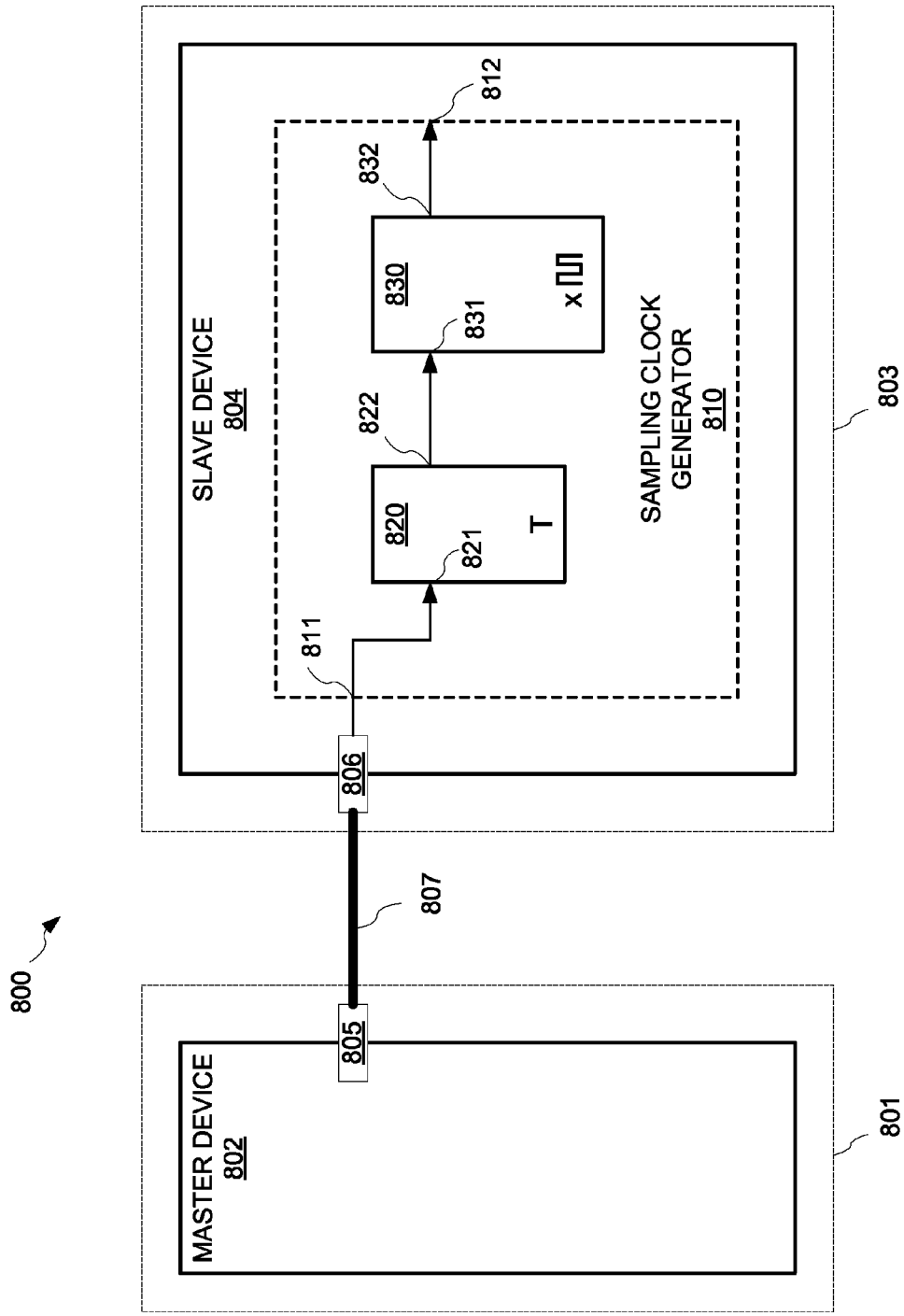
FIG. 8 depicts an example of a system for synchronous data transfer in accordance with some embodiments.

FIG. 8 depicts a block diagram showing a system 800 for synchronous data transfer in accordance with some embodiments. The system 800 comprises integrated circuit 801 including a master device 802, and integrated circuit 803 including a slave device 804. Either circuit 801, or circuit 803, or both, may include a configurable integrated circuit, such as a field programmable gate array, for performing at least some of the functions described herein (or other functions not described herein). Either integrated circuit 801 or integrated circuit 803, or both, may comprise programmable logic, such as those associated with field programmable gate array(s). The circuit 801 and circuit 803 may be implemented on separate respective substrates, or alternatively, on a same substrate. Port 805 of the master device 802 is coupled to port 806 of the slave device 804 through an interconnect 807. The master device 802 is configured to transmit an encoded signal of a clock period and forward data on port 805 over interconnect 807. The slave device 804 is configured to receive the encoded signal on port 806 and to recover the forward data from the encoded signal without a local oscillator.

In some embodiments, port 805 may be an output port and port 806 may be an input port. The interconnect 807 may be a unidirectional interconnect and may be a single-ended signal wire connection or a pair of differential signal wire connections. In some embodiments with an unidirectional interconnect, the encoded signal may comprise a repeated bit sequence that starts with the master device 802 transmitting a high logic level on the interconnect 807 during a first interval. This is followed by a second interval during which the master device 802 transmits a pattern that has at most one logic level transition and comprises n number of bits to represent one or more forward data bits. The bit sequence then ends with the master device 802 transmitting a low logic level during a third interval. The duration of the bit sequence is equal to the duration of the encoded clock period, and the bit sequence is repeated every clock cycle. In other embodiments, the master device 802 may transmit a low logic level during the first interval and a high logic level during the third interval. Examples of different embodiments of the bit sequence have been discussed above and are shown in FIG. 2, FIG. 3, and FIG. 4.

In other embodiments, port 805 may be an I/O port and port 806 may also be an I/O port. The interconnect 807 may be a bidirectional interconnect and may be a single-ended signal wire connection or a pair of differential signal wire connections. In the description below, flight time refers to the time for a signal to propagate along interconnect 807. In some embodiments, the interconnect 807 may be coupled to a pull-up component.

In some embodiments with a bidirectional interconnect, the encoded signal of the clock period and data comprises a repeated pattern of a pair of bit sequences. Refer to FIG. 5 for an example of the pair of bit sequences in some embodiments with a bidirectional interconnect. The first bit sequence starts with the master device 802 transmitting a high logic level on port 805 during a first interval 501. This is followed by a second interval 502 during which the master device 802 transmits a bit pattern that has at most one logic level transition and comprises n number of bits to represent one or more forward data bits. In the example of FIG. 5, one bit during the second interval 502 represents one forward data bit. The first bit sequence then ends with the master device 802 transmitting a low logic level during a third interval 503.

Following the first bit sequence, the second bit sequence starts with the master device 802 transmitting a high logic level on port 805 during a fourth interval 504. Once the master device 802 has driven the interconnect 807 to a high logic level, the master device 802 may then tri-state port 805 to release interconnect 807. The slave device 804 may then transmit backward data back to the master device 802 during a fifth interval 505. The slave device 804 may transmit a bit pattern that represents the backward data in the same way as the forward data, or the slave device 804 may transmit a bit pattern that represents the backward data differently from the way the forward data is represented. In some embodiments with a pull-up component coupled to the interconnect 807, the slave device 804 may transmit a high logic level by tri-stating port 806. To transmit a low logic level on interconnect 807, the slave device 804 actively drives port 806 to a low logic level. The slave device 804 may transmit a low logic level as soon as the master device 802 tri-states port 805 to allow more time for the low logic level to propagate to the master device 802.

The second bit sequence then ends with a sixth interval 506 with a low logic level on interconnect 807. When the slave device 804 transmits a low logic level during the fifth interval 505, the slave device 804 continues to hold interconnect 807 low until the low level is reinforced by the master device 802 during the sixth interval 506. This means the slave device 804 drives port 806 low for at least one flight time after the master device 802 starts to drive port 805 low. During the sixth interval 506, both the master device 802 and the slave device 804 may be driving interconnect 807 low. The low logic level from the slave device 804 does not contend with the low logic level from the master device 802. After the sixth interval 506, the pair of bit sequences repeats with the master device 802 transmitting a high logic level on interconnect 807. The slave device 804 releases interconnect 807 early enough such that the effective released line propagation allows the high logic level driven from the master device 802 to propagate towards the slave device 804. This released line propagation is equal to half the flight time of the interconnect 807.

The durations of each of the pair of bit sequences are equal to the duration of the encoded clock period, and the pair of bit sequences is repeated every two clock cycles. In other embodiments that start the pair of bit sequences on a falling edge clock, the first and fourth intervals may have a low logic level on interconnect 807 and the third and sixth intervals may have a high logic level on interconnect 807.

To recover the forward data from the received encoded signal, the slave device comprises a sampling clock generator 810 with an input 811 coupled to port 806 of the slave device 804 to derive a sampling clock output 812 with a period equal to $1/(n+2)$ times the encoded clock period, where n is the number of bits that represents the forward data transmitted during the second interval of the repeated bit sequence of the encoded signal. In some embodiments, the sampling clock generator 810 comprises a toggle flip-flop 820 to frequency divide the encoded signal by two and a clock multiplier 830. The input 821 of the toggle flip-flop 820 is coupled to the sampling clock generator input 811. The output 822 of the toggle flip-flop 820 is thus a divide-by-two clock with a 50:50 duty cycle and a frequency equal to half the frequency of the encoded clock.

In some embodiments, the input 831 of the clock multiplier 830 is coupled to the output 822 of the toggle flip-flop 820. The clock multiplier 830 is configured to frequency multiply the divide-by-two clock by $2\times(n+2)$ to generate a clock output 832 that has a period equal to $1/(n+2)$ of the encoded clock period. The output 832 of the clock multiplier is coupled to the sampling clock output 812 of the sampling clock generator 810. The sampling clock output 812 may then be used to sample the received encoded signal to recover the forward data.

In some embodiments, the clock multiplier 830 may be implemented with a digital clock manager (DCM) of a field programmable logic array. In other embodiments, the clock multiplier 830 may be implemented with a phase-locked loop (PLL) or a delay-lock loop (DLL), or any combination of DCM, PLL, and DLL. The clock multiplier 830 may also be used to generate other clocks with other frequencies as required by the slave device 804. The slave device 804 remains synchronous to the master device 802 because the sampling clock and any other clocks generated from the clock multiplier 830 are derived from the encoded clock period of the master device 802.

As illustrated in the above embodiments, the technique for data transmission is advantageous because it allows a slave device to obtain clock information while obviating the need to use a local oscillator at the slave device. This may reduce cost and complexity of the system. This may also reduce the number of I/Os required on a device as well as interconnect routing between devices.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims. Claims listing steps do not imply any order of the steps.

What is claimed is:

1. A method of synchronous data transfer, comprising:
encoding a first clock period and a plurality of forward data into an encoded signal;
transmitting the encoded signal from a master device to a slave device; and
recovering the plurality of forward data at the slave device without using a local oscillator, wherein the recovering the plurality of forward data at the slave device comprises:
generating a sampling clock with a second clock period equal to $1/(n+2)$ times the first clock period from the encoded signal; and
sampling the encoded signal with the generated sampling clock.

2. A method of synchronous data transfer, comprising:
encoding a first clock period and a plurality of forward data into an encoded signal;
transmitting the encoded signal from a master device to a slave device; and
recovering the plurality of forward data at the slave device without using a local oscillator;
wherein the encoded signal comprises: for each of the forward data, a first bit sequence having a first duration equal to the first clock period;
wherein the first bit sequence comprises: a first interval at a first logic level, a second interval comprising n bits to represent the forward data, and a third interval at a second logic level; and
wherein the encoded signal further comprises:
for each of the forward data, a second bit sequence following the first bit sequence having a second duration equal to the first clock period, wherein the second bit sequence comprises:
a fourth interval at the first logic level;
a tri-stated fifth interval to allow the slave device to transfer backward data to the master device; and
a sixth interval at the second logic level.

3. The method of claim 2, wherein the forward data comprises one data bit and n is equal to one.

4. The method of claim 2, wherein the forward data comprises two data bits and n is equal to three, and wherein the three bits of the second interval are the middle bits of a 5-bit 2b5b encoded data representing the two data bits of the forward data.

5. The method of claim 1, wherein the generating the sampling clock comprises:
frequency dividing the encoded signal by two to generate a divide-by-two clock; and
frequency multiplying the divide-by-two clock by $2\times(n+2)$.

6. The method of claim 5, wherein the frequency dividing the encoded signal by two is performed by a toggle flip-flop.

7. The method of claim 5, wherein the frequency multiplying the half-clock signal is performed by at least one of a digital clock manager (DCM), a delay-locked loop (DLL), and a phase-locked loop (PLL).

8. An apparatus for synchronous data transfer, comprising:
a first integrated circuit including a master device, wherein the master device is configured to transmit an encoded signal of a first clock period and a plurality of forward data on a first port; and
a second integrated circuit including a slave device, wherein the slave device is configured to receive the encoded signal on a second port coupled to the first port and to recover the plurality of forward data without using a local oscillator;
wherein the slave device comprises a sampling clock generator with an encoded signal input coupled to the second port to generate a sampling clock output with a second clock period equal to $1/(n+2)$ times the first clock period, and wherein n represents a number of bits in an interval of the encoded signal.

9. The apparatus of claim 8, wherein at least one of the master device and the slave device comprises a configurable integrated circuit.

10. The apparatus of claim 8, wherein the encoded signal comprises:
for each of the forward data a first bit sequence having a first duration equal to the first clock period, wherein the first bit sequence comprises:
a first interval at a first logic level;
a second interval comprising n bits to represent the forward data; and
a third interval at a second logic level.

11. The apparatus of claim 10, wherein the encoded signal further comprises:
for each of the forward data, a second bit sequence following the first bit sequence having a second duration equal to the first clock period,
wherein the second bit sequence comprises:
a fourth interval at the first logic level,
a tri-stated fifth interval to allow the slave device to transfer backward data to the master device, and
a sixth interval at the second logic level.

12. The apparatus of claim 8, wherein the first port is coupled to the second port through a unidirectional interconnect or a bidirectional interconnect.

13. The apparatus of claim 8, wherein the sampling clock generator comprises:
a toggle flip-flop with a first clock input and a toggle output; and
a clock multiplier with a second clock input and a clock output;
wherein the first clock input of the toggle flip-flop is coupled to the encoded signal input of the sampling clock generator, the toggle output of the toggle flip-flop is coupled to the second clock input of the clock multiplier, the clock output of the clock multiplier is coupled to the sampling clock output of the sampling clock generator, and
the clock multiplier is configured to frequency multiply the second clock input by $2\times(n+2)$.

14. The apparatus of claim 13, wherein the clock multiplier is implemented with at least one of a digital clock manager (DCM), a phase-locked loop (PLL), and a delay-locked loop (DLL).

15. An apparatus for data processing, comprising:
an integrated circuit including a slave device, wherein the slave device has a first input port configured to receive a plurality of bit sequences that correspond to respective data, wherein at least one of the bit sequences has a duration equal to a first clock period and comprises:
a first interval at a first logic level;
a second interval comprising n bits that represents one of the plurality of data; and
a third interval at a second logic level,
wherein the slave device is configured to recover at least one of the plurality of data without using a local oscillator; and
wherein the slave device comprises a sampling clock generator with an encoded signal input coupled to the first input port to generate a sampling clock output with a second clock period equal to $1/(n+2)$ times the first clock period.

16. The apparatus of claim 15, wherein the sampling clock generator comprises:
a toggle flip-flop with a first clock input and a toggle output; and
a clock multiplier with a second clock input and a clock output;
wherein the first clock input of the toggle flip-flop is coupled to the encoded signal input of the sampling clock generator, the toggle output of the toggle flip-flop is coupled to the second clock input of the clock multiplier, and the clock output of the clock multiplier is coupled to the sampling clock output of the sampling clock generator; and
wherein the clock multiplier is configured to frequency multiply the second clock input by $2\times(n+2)$.

* * * * *